Sept. 25, 1928.

D. C. LAMB 1,685,457

PRESSURE RESPONSIVE INSTRUMENT OF THE BOURDON SPRING TYPE

Filed June 9, 1927

INVENTOR:
Donald C. Lamb
BY Alfred Berger
his ATTORNEY.

Patented Sept. 25, 1928.

1,685,457

UNITED STATES PATENT OFFICE.

DONALD C. LAMB, OF ROCHESTER, NEW YORK, ASSIGNOR TO TAYLOR INSTRUMENT COMPANIES, OF ROCHESTER, NEW YORK, A CORPORATION OF NEW YORK.

PRESSURE-RESPONSIVE INSTRUMENT OF THE BOURDON SPRING TYPE.

Application filed June 9, 1927. Serial No. 197,644.

This invention relates to pressure-responsive instruments of the Bourdon spring type.

One object of the invention is an instrument of the class referred to, which is accurately responsive to all changes of pressures within the range for which it is designed.

Another object is to produce a reliable instrument requiring a relatively small bulb.

Another object is an instrument practically insensitive to the effects of temperature changes.

The principal and more general object is the provision of an instrument of the character involved, having certain desirable characteristics and being better suited for particular purposes than instruments heretofore provided.

For a full understanding of the invention, its distinctive features both as to construction and operation and its advantages, reference is made to the accompanying drawings, wherein Fig. 1 is a front elevation, partly in section of a structure embodying the invention;

Figure 1:
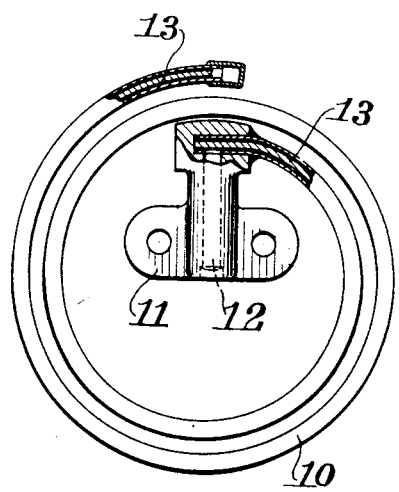
Figure 2:
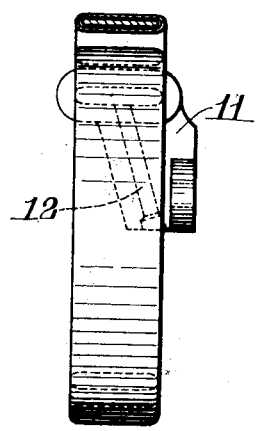
Fig. 2 is an end view thereof, a part being removed.

In the drawings 10 is a multiple-convolution spring of the Bourdon tube type connected at its inner end to a support 11 which defines a conduit 12 for fluid connection with a capillary, as is well understood. The outer or free end of the spring is closed up in the usual way to make it fluid tight against relatively high pressures.

The structures thus far described, represents a usual and generally known device.

The invention in its broadest and most essential aspect consists of a strip 13 disposed in the tube, being secured thereto at its inner or stationary end, and extending preferably to the free end.

The significance of the strip 13 is this:

For heat-dynamic reasons, it is practically necessary to reduce the volume of the spring to a minimum. In the first instance a large volume of fluid in the spring would in some cases cause changes of pressure due to temperature changes or would materially increase the error caused thereby. Secondly, a large volume in the spring would require a correspondingly large bulb.

Now, while tubes may be rolled down substantially flat leaving practically no space for fluid, decreases of volume in that manner is attended by undesirable mechanical characteristics of the spring thus produced or in order to obtain a spring of desirable mechanical characteristics, it was necessary to select tubes of heavy stock and relatively thick walls, which in turn require a high fluid pressure for operation and involve serious functional disadvantages for that reason.

I have found that it is possible to produce a pressure-responsive instrument of desirable mechanical characteristics susceptible to operation at relatively low pressure and responsive to relatively small changes in pressure, by making the Bourdon spring of relatively thin stock provided the tube stock is not rolled down flat but is left in what may be called a slightly oval condition in cross-section. The increase in volume caused thereby is neutralized by the filler strip 13.

The strip 13 thus is primarily a filler compensating for the increase of space incident to the changes in the Bourdon tube.

In practice, however, I do not propose to use a filler of hap-hazard properties i. e. for the sole purpose of filling an excess space, irrespective of its characteristics in other respects. I propose to use a filler strip of a high degree of resiliency adapted to mechanically react upon a Bourdon spring so that the pressure indication is in a sense the result of a compound action. While various metals are available for making a suitable filler strip 13, I preferably use high grade steel. In practice the strip is inserted in the tube and coiled together with the tube. When the tube, as part of a gas or liquid-filled tube system is exposed to increases of pressure rising from a normal minimum, the spring tube 10 is forced to expand against both the resistance of the spring tube and the resistance of the filler spring 13. The resistance of the latter, depending upon the quality of the material, the thickness of the strip and its length, is practically constant for all positions of the strip between the usual limits of the expansive movement and may, at any rate, be so chosen and determined as to provide a suitable positive force of substantially constant sensitivity tending to move the spring tube to closing position. This co-operation of the filler spring 13 with the spring tube 10 is highly beneficial to the operation of the latter. The function of the spring tube and all tubes of the Bourdon type, is to assume a position which is a function of the pressure within it. While the tubes are made of resilient material, they are not highly sensitive as springs and at least cannot compare as springs with springs not in the form of tubes. They have, in particular the disadvantage that at lower pressures their position is not sufficiently definite to be accurate. A filler spring 13 thus artificially adds that degree of true resiliency which the spring tube 13 alone is inherently lacking. The mechanical effect is much the same as though the resiliency of the spring tube proper were increased.

In one practical and what I consider at present as the preferred embodiment of the invention I propose to include as at least a part of a resilient filler strip 13, a thermostatic strip 13ª, so disposed that an increase of temperature tends to cause a contraction of the spring tube and a decrease of temperature permits an increase in the expansive movement of the tube. I have found that for temperature compensation a thermostatic strip extending only a fraction of the length of the tube is sufficient and the remaining part to the free end of the tube may be any suitable spring united with the thermostatic strip as by welding or brazing or the like.

Figure 3:
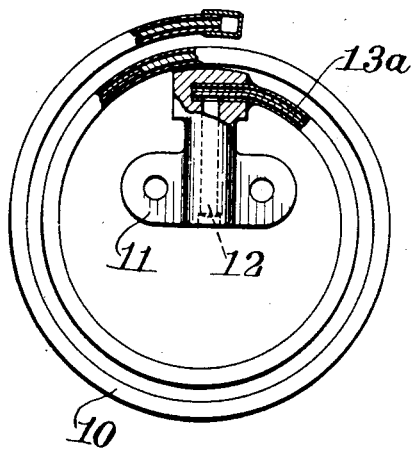
Fig. 3 is a view similar to Fig. 1 of another embodiment of the invention.

In practice, the dimensions of the thermostatic strip are determined to suit the conditions involved and then there is joined to it a strip of steel, brass or other suitable material to make the required length. The composite strip is then inserted in the tube to be used in forming the pressure-responsive element. The tube is then coiled to the required shape. In Fig. 3, I have shown the thermostatic strip 13ª as a bimetallic strip of usual construction.

There is considerable latitude in the construction of the strip 13, but for the reasons above pointed out, I preferably use such material or materials as to best satisfy all requirements for a good instrument.

While a tube such as described is more generally applicable, it is particularly useful in connection with gas-filled systems.

I claim:

1. In apparatus of the character described, the combination of a pressure-responsive tube and a filler core therein consisting of a strip of resilient metal substantially filling the space defined by the walls of the tube, a portion of the strip consisting of thermostatic material.

2. In apparatus of the character described, the combination of a pressure-responsive tube and a filler core therein consisting of a resilient thermostatic strip and a resilient metal strip joined thereto and extending to the free end of the tube.

3. In apparatus of the character described, a Bourdon tube of resilient metal having substantially parallel opposing walls in close proximity to each other, a core of resilient metal substantially filling the space defined by the walls and a support for the tube rigidly connected to the latter, the said core being rigidly connected with the tube at the point of connection of the latter with the support and being free to move relatively to the tube at its opposite end.

In testimony whereof I affix my signature.

DONALD C. LAMB.